(No Model.) 6 Sheets—Sheet 3.

A. FOSGATE.
TYPE WRITING MACHINE.

No. 568,301. Patented Sept. 22, 1896.

WITNESSES:
E. L. Yewell.
Wm. F. Huntemann.

INVENTOR.
Alfred Fosgate
by Alex Mahon
Attorney

THE NORRIS PETERS CO., PHOTO-LITHO., WASHINGTON, D. C.

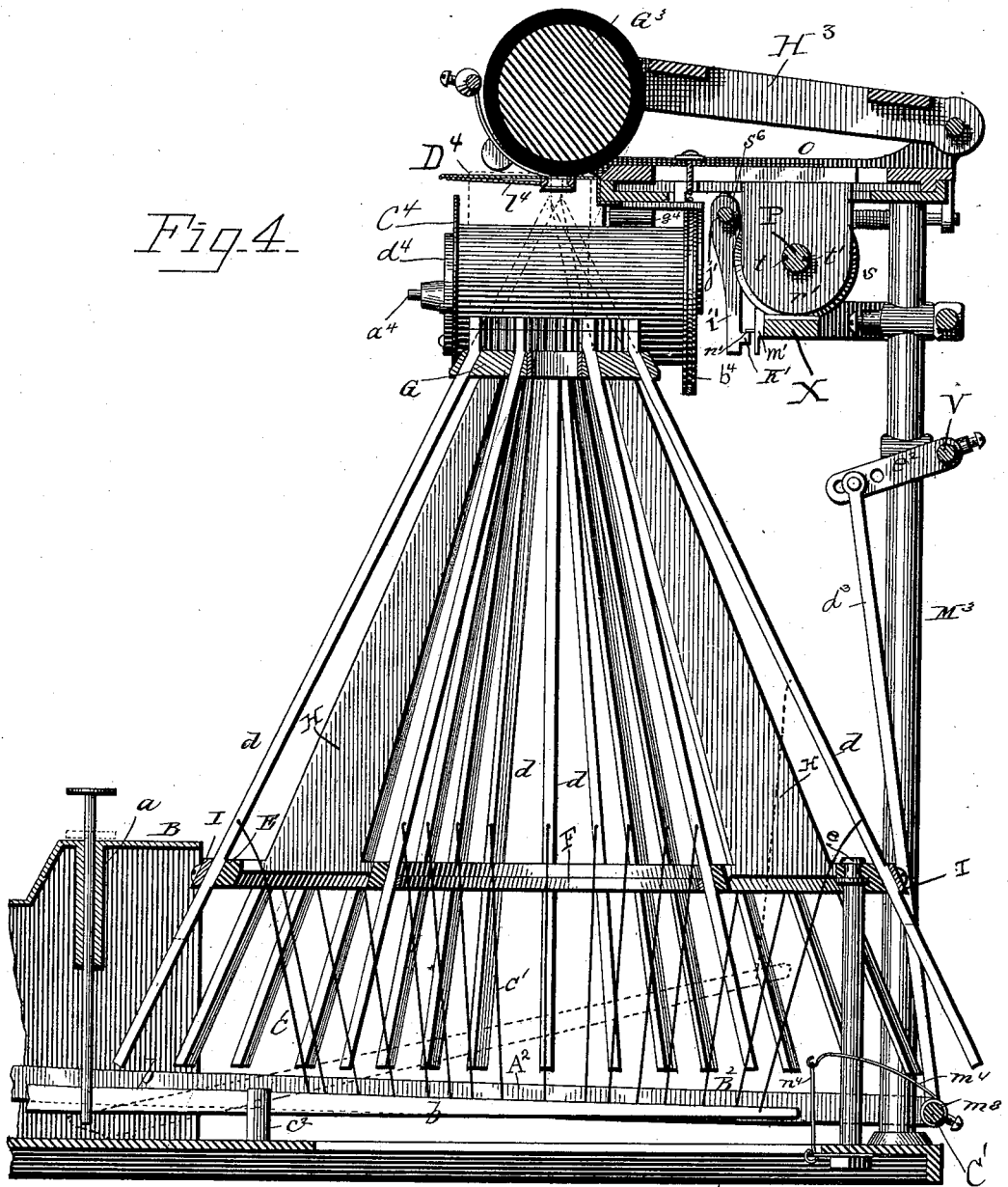

(No Model.) 6 Sheets—Sheet 5.
A. FOSGATE.
TYPE WRITING MACHINE.
No. 568,301. Patented Sept. 22, 1896.
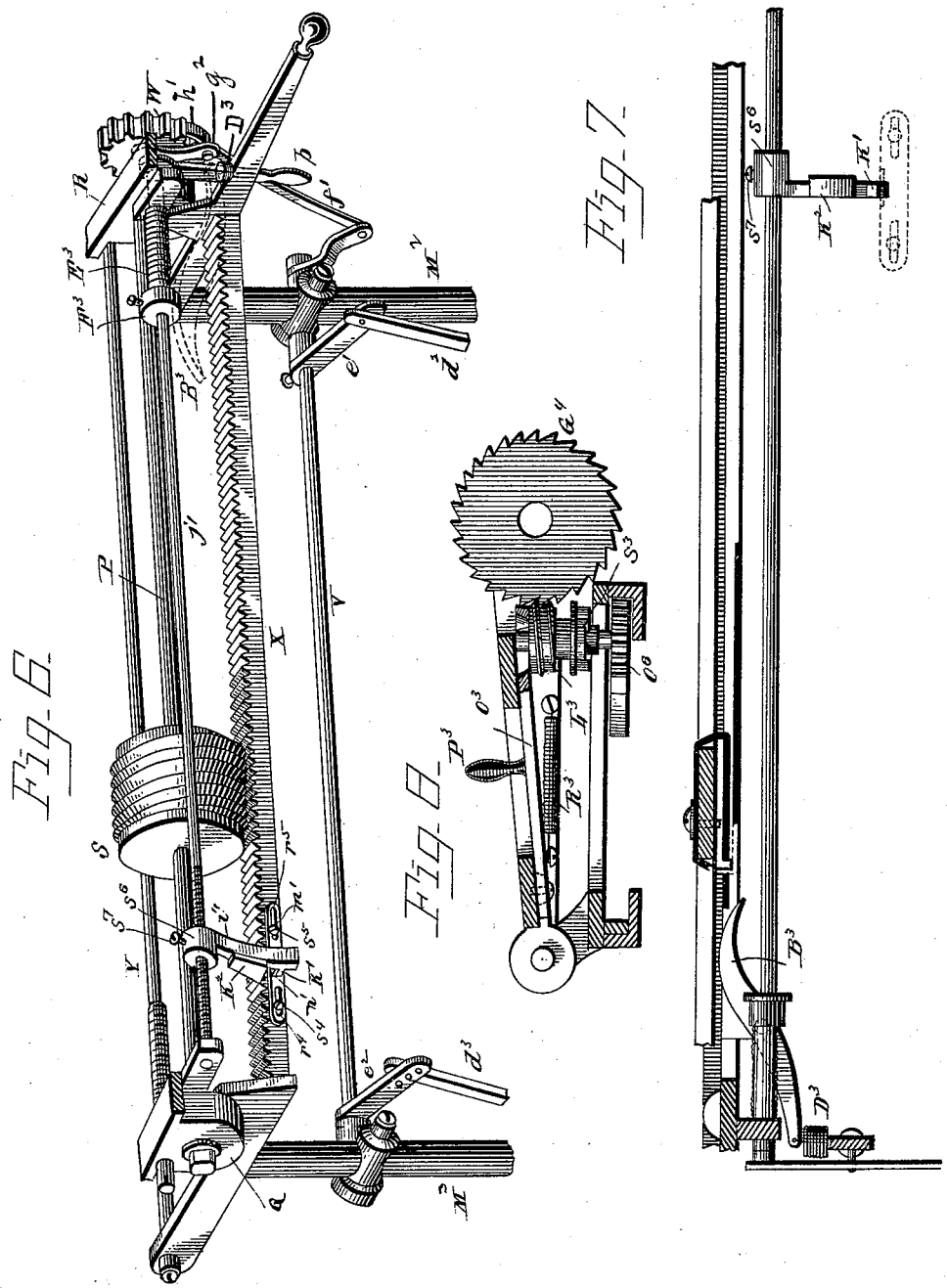
WITNESSES  
E. L. Yewell,  
Wm. F. Huntemann
INVENTOR  
Alfred Fosgate  
by Alex Mahon  
Attorney (No Model.)  A. FOSGATE.  6 Sheets—Sheet 6.
TYPE WRITING MACHINE.

No. 568,301.   Patented Sept. 22, 1896.

Witnesses
Edwin L. Yewell.
Wm. F. Huntemann.

Inventor
Alfred Fosgate
By his Attorney
Alex Mahon

THE NORRIS PETERS CO., PHOTO-LITHO., WASHINGTON, D. C.

UNITED STATES PATENT OFFICE.

ALFRED FOSGATE, OF AUBURN, NEW YORK.

TYPE-WRITING MACHINE.

SPECIFICATION forming part of Letters Patent No. 568,301, dated September 22, 1896.

Application filed January 11, 1887. Serial No. 224,045. (No model.)

*To all whom it may concern:*

Be it known that I, ALFRED FOSGATE, of Auburn, county of Cayuga, State of New York, have invented certain new and useful Improvements in Type-Writing Machines, of which the following is a full and exact description, reference being had to the accompanying drawings, making part of this specification.

My invention relates to that class of typewriters in which the type are mounted upon the ends of reciprocating type rods or carriers.

The invention consists in certain novel combinations and arrangements of parts, all as hereinafter described and claimed.

It further consists in certain details in the construction and arrangement of parts, all as hereinafter explained.

Figure 1:
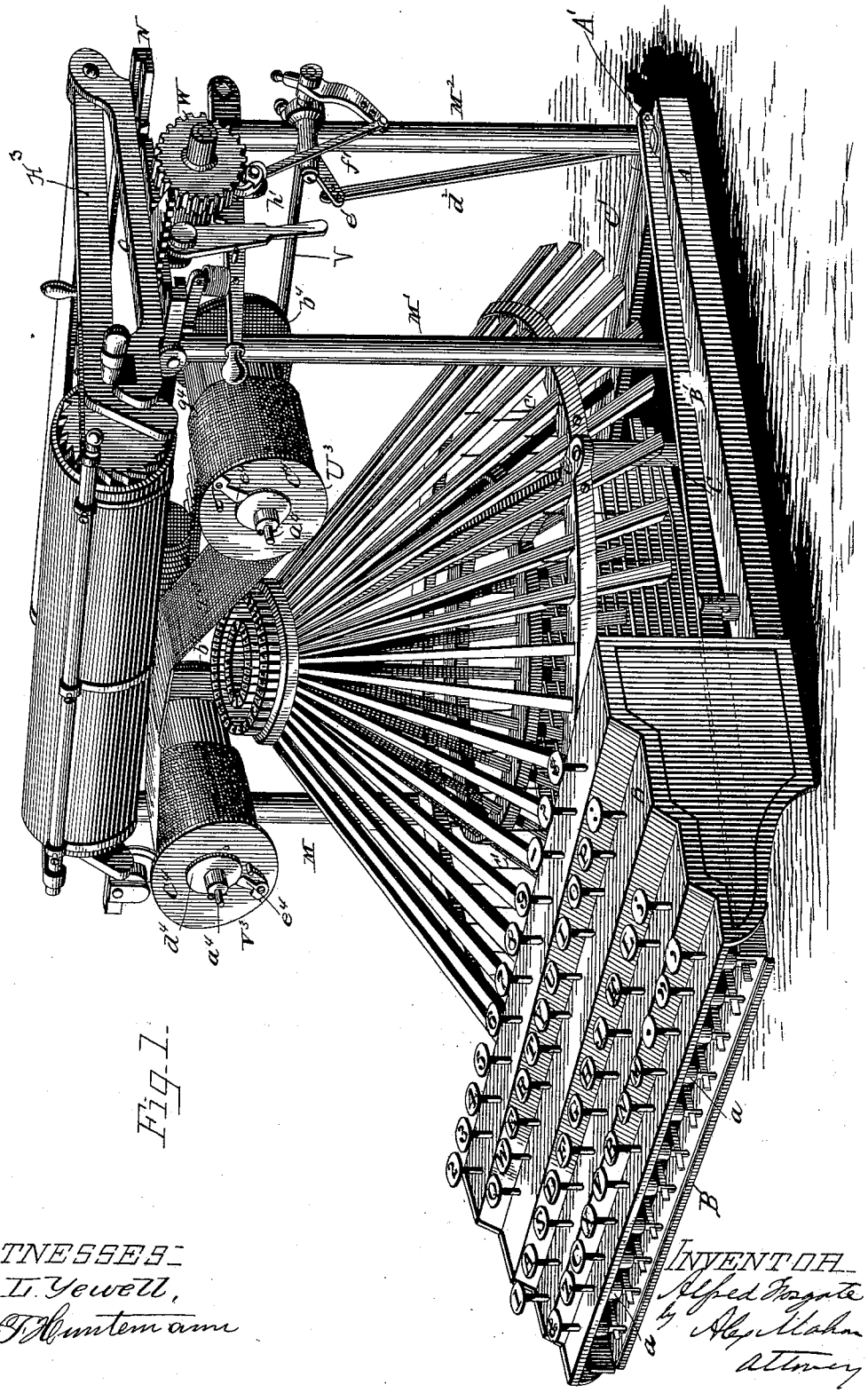
Figure 2:
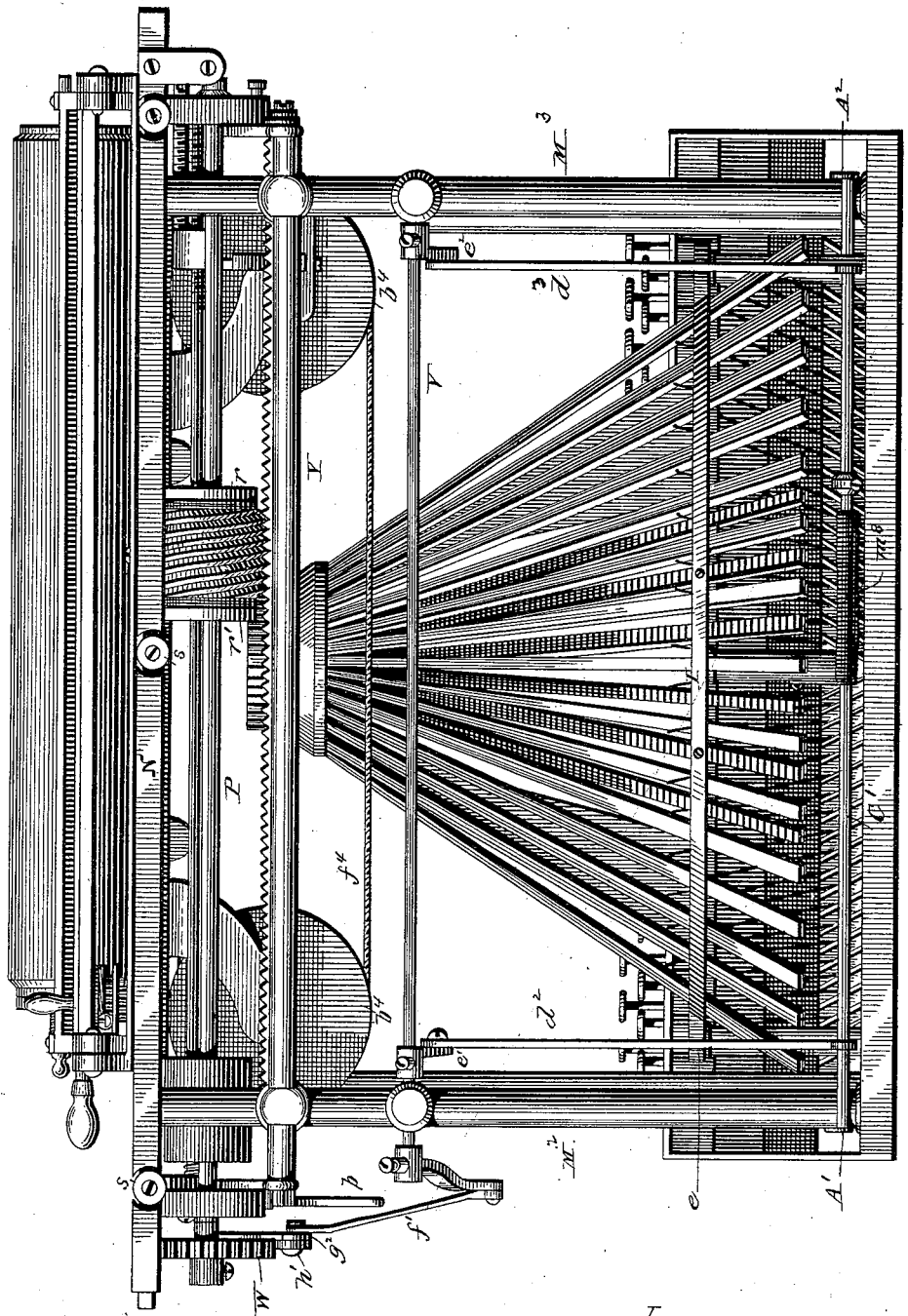
Figure 3:
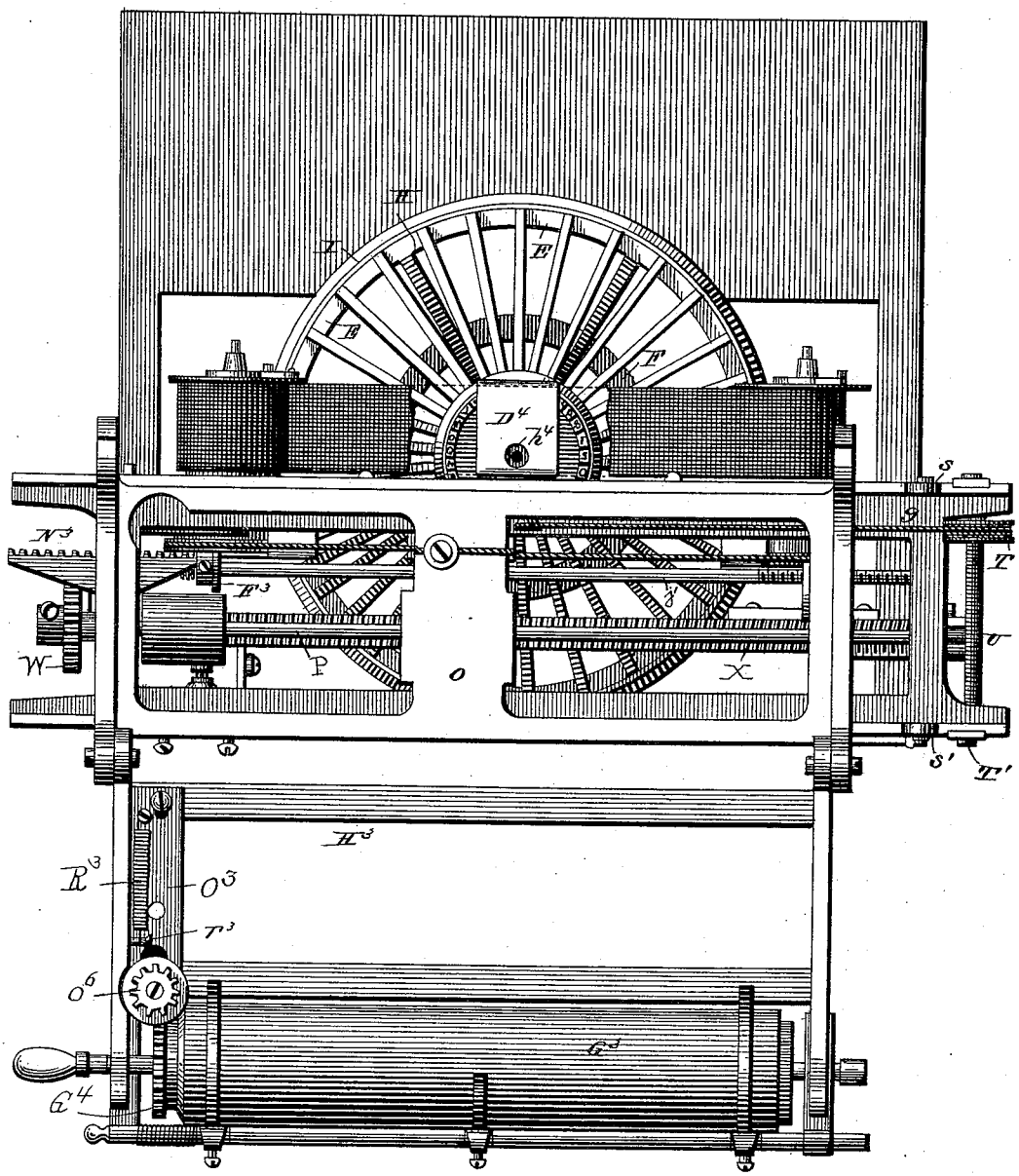
Figure 9:
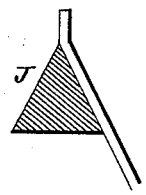
Figure 10:
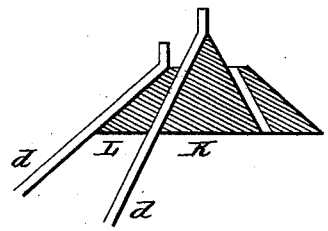
Figure 11:
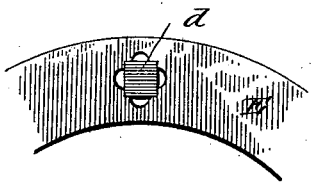

In the accompanying drawings, Figure 1 is a perspective view of my improved typewriter, showing so much thereof as is necessary to an understanding of my invention. Fig. 2 is a rear view of the same. Fig. 3 is a plan or top view of the same, showing the paper-carriage thrown back. Fig. 4 is a longitudinal section of the machine with a portion of the keyboard broken away. Fig. 5 is a section through a portion of the platen, the ribbon-supporting plate, and the perforated button through which the type moves to engage the paper on the platen. Fig. 6 is a perspective view of the rack, worm-wheel, trip, and the mechanism for operating the worm-wheel and for operating the trip both to throw the same into and out of action with the rack. Fig. 7 is a detached view of a portion of the carriage, showing the trip for throwing the rack into engagement with the worm-wheel. Fig. 8 is a transverse section of the carriage, showing the gearing for operating or revolving the platen. Fig. 9 is a sectional view of a type-supporting frame, showing a modification in the form thereof and where a single circle of letters is employed. Fig. 10 is a similar view showing the construction where a double circle of letters are used; and Fig. 11 is a section through a portion of the type-rod-guiding frame, showing the manner of mounting the same therein.

Similar letters of reference indicate similar parts throughout the several views.

The working parts are mounted upon a suitable frame, consisting of a base A and supporting-standards hereinafter more particularly referred to. Upon the forward portion of the frame is secured the stepped keyboard B, above and through which project the reciprocating keys, as shown, each key exhibiting upon its upper surface the letter, number, or other character which it is adapted to print.

The key-stems work freely through perforations in the keyboard, and are constantly maintained in a vertical position by guide-sleeves. One series of these guide-sleeves is shown at $a$ in Fig. 1 and the detailed construction thereof in section at $a$, Fig. 4.

The lower ends of the key-stems are forked or branched and rest upon the outer ends of a series of levers $b$, pivoted to rock in vertical planes within studs $c$, projecting upwardly from the base-plate A. The inner ends of the levers $b$ are loosely connected by means of wires $c'$ with a corresponding number of type-bars $d$, arranged in concentric series, each series by reason of the inclination of its members toward a common point presenting the general configuration of the frustum of a cone. The inclined bars are provided at their upper ends with vertical extensions, each bearing a type corresponding to that indicated by the key to which it is connected. The bars are maintained and guided in their inclined position by means of a supplemental frame mounted upon the standards C. This frame consists of two lower concentric rings E F, united at intervals of their circumference with each other and with an upper ring G by means of the strengthening-braces H. The parts may be readily cast together and are united to the standards C by means of the lugs $e$. The outer series of type-bars rest upon and within a series of equally-spaced steps or recesses in the peripheries of the ring E and pass through a series of perforations in the ring G. A removable band I, secured to the ring E, confines them against displacement.

The inner series of type-bars are mounted within the inner ring F and ring G in a similar manner, as will appear more clearly from Fig. 4.

In Figs. 9 and 10 I have represented modifications of the means just described for guiding the type-bars. Thus in Fig. 9, wherein but a single series of type-bars is represented, the bars are adapted to slide over the surface of a cone J, thereby receiving a support throughout their entire length and lessening the liability of the bars to accidental flexure. In Fig. 10 this construction is modified further to permit of the use of concentric series of type-bars. In this instance the inner series receives guiding support from the conical surface K and the outer series from the conical surface L.

It will be noted that the type-bars are represented as angular in cross-section. This feature is an important one, inasmuch as in connection with the angular openings in the rings through which the bars pass it prevents axial rotation of the bars and thereby maintains the type in alinement.

To lessen friction between the moving bars and the guide-openings in the rings, I deem it preferable in most instances to form the said openings after the manner illustrated in Fig. 11. In this form the opening is of general circular contour, but is cornered or grooved slightly to correspond with the shape of the bar, thereby securing the result desired.

At the rear end of the machine are located standards M, M', M², and M³, which support the carriage-way N. The frame O of the carriage is mounted to reciprocate in this carriage-way in guides formed by grooves and flanges on the frame and way, respectively. Freely-revoluble friction-wheels $s$ $s'$, &c., facilitate this movement.

A shaft P is journaled to revolve freely within bearings Q R, connected with the carriage-way. This shaft is channeled or grooved at $t$ $t'$ throughout its length, and upon it is mounted the worm-wheel S, having suitable projections fitting within said channels, whereby when the shaft is rotated the worm-wheel is caused to turn with it. This construction also permits the worm-wheel to travel along the shaft P during the operation of the machine. Lugs $r$ $r'$, perforated for the passage of the shaft P, project downwardly from the carriage at opposite ends of the worm-wheel S, whereby any longitudinal motion along the shaft imparted to the wheel S is transmitted to the carriage. The carriage is constantly drawn toward the left by means of a cord $g$, connected with a grooved wheel T, mounted loosely upon a rod or shaft T', attached to the carriage-way. This rod is encircled by a torsion-spring U, fixed to the carriage-way at one end and to the wheel T at the other, the arrangement being such that the spring will be wound in moving the carriage from left to right.

The shaft P, which imparts motion through the medium of the worm-wheel S to the carriage, is actuated from the type-keys and spacing-pedal in the following manner:

A rectangular frame, consisting of the side bars A' A², front bars, (not shown,) and rear bar C', is pivoted to oscillate upon the stud projections $c^2$ upon the frame A. The front bars extend transversely beneath the type-levers, so that with each depression of any one of said levers the frame is rocked upon its pivots and the rear bar C' elevated. Upon the said rear bar are rigidly secured arms $d^2$ $d^3$, connected by pin and slot to arms $e'$ $e^2$, connected with the rock-shaft V. Said rock-shaft is in turn connected by a link $f'$ with an arm $g^2$, mounted loosely upon the shaft P. The arm $g^2$ carries a spring-pawl $h'$, adapted to engage with and rotate a cog-wheel W, fixed upon the shaft P. Motion transmitted through this mechanism to the shaft P and worm S is imparted to the carriage by causing the worm to engage with a swinging rack X, attached to the rock-shaft Y, and the rack is provided with an operating-handle. The rack X is retained in its raised position by means of an adjustable stop $i'$, fixed upon the rock-shaft $j'$ at the left of the machine, said stop being provided with projections K' K². An adjustable plate $m'$ is attached to the side of the rack X and is provided with a projection $n'$, adapted to rest upon the projection K' when the rack is raised. To permit the rack to drop, thereby releasing it from engagement, so that the carriage may be moved back toward the right, the rock-shaft $j'$ may be oscillated by means of the handle $p$, thereby retracting the stop $i'$ from the rack X. This dropping of the rack is effected, however, automatically at the end of each full line printed by the machine by reason of the worm-wheel S striking against the projection K², and thereby throwing out the stop $i'$. It is therefore only necessary to make use of the handle $p$ when less than a full line has been printed. On the return of the carriage to its original position at the right of the machine the rack is automatically raised and retained in engagement with the worm. This result is attained by the following means: A curved lever B³ is pivoted to the carriage-way in the path of movement of the worm-wheel S, and at its outer end this lever is connected by means of the spring D³ with the handle of the rack.

When the carriage is moved toward the right, the lug $r'$ depresses the free end of the curved lever B³, thereby distending the spring D³ and causing said spring to pull in an upward direction upon the handle and rack. The rack is, however, prevented from rising by reason of the engagement of the projection K' upon the stop $i'$ above the projection $n'$ upon the rack. This locking engagement of the said projection continues until the lug $r'$ has depressed the lever B³ and has distended the spring D³ to the fullest extent contemplated in the machine. At this moment the lug $r'$ rides upon the summit of the curve of the lever B³, and immediately thereafter the said lug $r'$, moving farther toward the right, strikes the fixed collar F³ upon the shaft $j'$ and moves said shaft longitudinally against the pressure of the spring $E^3$ toward the right a distance sufficient to move the projection $K'$ of the stop $i'$ toward the right away from the stop $n'$ upon the rack. The rack is then free to rise under the influence of the accumulated force in the spring $D^3$. The carriage being then released, its first movement toward the left of the machine permits the shaft $j'$ to move back under the influence of its spring $E^3$ in a longitudinal direction toward the left, thereby resuming its original position. The projection $K'$ engages beneath the projection $n'$ of the rack, thereby holding the rack in its raised position during the further progress of the carriage toward the left.

It will be observed that the plate $m'$ upon the rack-bar is provided with slots $r^4 r^5$, whereby by means of the binding-screws $s^4 s^5$ it may be adjusted longitudinally or its position on the rack-bar changed. The stop-piece or trip $i'$ is also capable of a corresponding adjustment upon the rock-shaft through the collar $s^6$, through which it is connected to the shaft and a set-screw $s^7$, which hold it engaged with the shaft.

The revolving platen $G^3$ is mounted in bearings in the front portion of the pivoted frame $H^3$. At one end it is provided with the ratchet-wheel $G^4$. This ratchet-wheel meshes with a worm-wheel $L^3$, mounted within the carriage upon a sliding plate $O^3$, and at the lower extremity of the worm-wheel shaft is located the cog-wheel $O^6$, connected with said worm-wheel by a backing-ratchet $S^3$. Upon the carriage-way is attached a rack $N^3$, adapted to engage with said cog. When the carriage is moved toward the right, just before it reaches its final position the cog $O^6$ engages with the rack $N^3$ and is revolved thereby, in turn revolving (through intermediary worm $L^3$) the ratchet $G^4$, thereby causing the platen $G^3$ to automatically revolve a distance equal to the desired space between the lines to be printed. It is evident that this distance will depend upon the length of the rack employed, and may be varied at will by shifting the said rack longitudinally.

If for any reason it is desired to vary the spacing between the lines, the worm-wheel may be retracted from engagement with the ratchet $G^4$ by means of the sliding plate $O^3$, within which said worm-wheel is mounted, the said plate being operated by the handle $P^3$. The worm is normally held in the position represented in the drawings by means of the spring $R^3$, attached to a stud $r^3$, connected to the frame $H^3$ and also to the sliding plate $O^3$.

Beneath the revolving platen $G^3$ is located the type-inking ribbon $T^3$, distended between spools or rollers $U^3$ and $V^3$, by means of which it is fed during the operation of the machine. Each spool is mounted upon a revoluble axis or shaft $a^4$, carrying at one end the pulley $b^4$ and at the other end the disk $d^4$. The barrel $C^4$ of the spool is mounted loosely upon the shaft $a^4$ thereof, but is adapted to be clutched thereon by means of the spring-pawl $e^4$, which operates as a backing-ratchet, causing the barrel to revolve only when the carriage is moved from right to left. The pulleys which operate the spools are driven by a cord $f^4$, connected with the carriage and passing from thence around the pulleys. A roller $g^4$, supported from the carriage-way by a light spring, rests upon the surface of the spool-barrel to prevent the roll of ribbon from shifting sidewise along the barrel.

The ribbon $T^3$ is supported at its middle portion upon the plate $D^4$. This plate is perforated for the reception of the button $h^4$, which has an aperture corresponding in location to the point where the type strike the platen when the keys are operated. The aperture has below a flaring mouth, thereby serving to guide the type into the proper striking position should they become slightly out of line.

The pivoted frame which transmits motion from the type-actuating levers to the step-by-step mechanism of the carriage is provided with a coil-spring $m^3$ for returning said frame promptly to its normal position after the type-key has been struck. The ends of the spring are respectively connected to the rear bar of the frame and to a link $n^4$, extending from the framework A.

A spacing-bar B is employed having suitable arms or levers projecting therefrom, which are pivoted in studs $C^2$, mounted in the base-plate, the arms or levers being arranged to engage one or both of the bars $B' B^2$ of the carriage-operating mechanism and by the movement in pressing down upon the bar to rock the frame in a similar manner to that described in its operation by the type-keys. If preferred, however, an arm or key may project outwardly from or made in any manner to directly engage the bar $B'$ to depress the same.

Having now described my invention, what I claim is—

1. In a type-writer, the combination with the longitudinally-reciprocating type-bars arranged in an inclined position within guides about a common center, of pivoted actuating-levers, keys resting upon one end of said levers, and links connecting the other end of said levers with the type-bars, a carriage, the rocking frame actuated by the keys, a rack-bar, and worm for moving said carriage, and mechanism connecting the worm with the rocking frame for imparting motion to the carriage from the keys, substantially as set forth.

2. In a type-writer, the combination with the longitudinally-reciprocating type-bars, arranged in concentric series in an inclined position, of a guide-frame therefor consisting of ring-supports, mounted upon standards, the upper ring serving as a stop to limit the downward or return movement of the type-bars, pivoted actuating-levers, keys resting upon one end of said levers, and links connecting the other end of said levers with the type-bars, a carriage, and mechanism for imparting motion to the carriage from the keys, substantially as set forth.

3. The combination of the traveling platen-carriage, the worm-wheel, a pivoted rack connected to the frame, a swinging rack, X, connected to the rock-shaft Y, an operating-handle on the rack, an adjustable stop on the rock-shaft, provided with projections $K'$ $K^2$, an adjustable plate, $m'$, attached to the side of the rack X, provided with a projection $n'$, substantially as described, whereby the rack may be thrown into action either automatically or by hand, as set forth.

4. In a type-writer, the combination with the keys, of letter-spacing mechanism, consisting of a pivoted frame located beneath the type-bar-actuating levers, a rock-shaft, link mechanism between the frame and rock-shaft, a rotatable shaft provided with a longitudinally-movable worm-wheel rotatable, with said shaft, the platen-carriage located in the path of longitudinal movement of the worm-wheel, and a drop-rack connected with the machine-frame, substantially as set forth.

5. In a type-writer, the combination with the carriage-actuating worm-wheel, of the pivoted drop-rack provided with a projection upon its side, a longitudinally-reciprocal shaft provided with a projection normally located in the same vertical plane with the rack projection, a trip-lug upon the shaft located at the right of the machine in the line of movement of the carriage, and a recoil-spring for the shaft, substantially as set forth.

6. In a type-writer, the combination with the carriage-actuating worm-wheel, of the pivoted drop-rack provided with a projection upon its side, a longitudinally-reciprocal recoil-shaft provided with a projection located in the same vertical plane with the rack projection, a trip-lug upon the shaft located at the right of the machine, and a pivoted lever connected with the pivoted rack and located in the line of movement of the carriage in advance of the shaft-lug, and a coil-spring connecting the lever and rack, substantially as described.

7. In a type-writer, the combination with the rotatable platen provided with a ratchet-wheel, a rack located upon the frame at the right of the machine, a cog engaging with said rack, a worm-wheel engaging with the ratchet-wheel, and a backing-ratchet connecting the cog and worm-wheel, substantially as set forth.

ALFRED FOSGATE.

Witnesses:
E. D. WOODRUFF,
FRANK S. COBURN.